US008725131B1

(12) United States Patent
Kirkham et al.

(10) Patent No.: US 8,725,131 B1
(45) Date of Patent: *May 13, 2014

(54) TECHNIQUES FOR AUTOMATICALLY ACTIVATING OR DEACTIVATING A PHONE ASSOCIATED WITH A VIRTUAL PHONE NUMBER

(75) Inventors: Stephen Kirkham, San Francisco, CA (US); Brandon Bilinski, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/525,930

(22) Filed: Jun. 18, 2012

Related U.S. Application Data

(63) Continuation of application No. 13/314,602, filed on Dec. 8, 2011.

(51) Int. Cl.
*H04M 3/42* (2006.01)

(52) U.S. Cl.
USPC ............... 455/417; 455/414.1; 455/456.1; 455/456.6; 455/432.1; 455/435.1

(58) Field of Classification Search
USPC ........ 455/404.2, 456.1–457, 417, 432.1–434, 455/435.1–453.3, 414.1, 418; 340/539.13, 340/988–996; 379/211.01, 211.02, 212.01; D10/104.2

See application file for complete search history.

(56) References Cited

U.S. PATENT DOCUMENTS

| | | | |
|---|---|---|---|
| 5,978,673 A * | 11/1999 | Alperovich et al. | 455/417 |
| 6,091,948 A | 7/2000 | Carr et al. | |
| 7,395,075 B2 * | 7/2008 | Posner et al. | 455/456.1 |
| 7,808,980 B2 | 10/2010 | Skakkebaek et al. | |
| 7,907,903 B2 | 3/2011 | Shen | |
| 2008/0153480 A1 | 6/2008 | Jiang | |
| 2009/0005070 A1 | 1/2009 | Forstall et al. | |
| 2009/0082001 A1 * | 3/2009 | Rahul et al. | 455/418 |
| 2009/0131026 A1 * | 5/2009 | Allen et al. | 455/417 |
| 2010/0128857 A1 | 5/2010 | Logan | |
| 2010/0130228 A1 * | 5/2010 | Vendrow et al. | 455/456.1 |
| 2010/0279673 A1 | 11/2010 | Sharp et al. | |
| 2011/0059732 A1 * | 3/2011 | Cai et al. | 455/417 |
| 2011/0112768 A1 * | 5/2011 | Doyle | 701/300 |
| 2011/0209221 A1 | 8/2011 | Hanson et al. | |

* cited by examiner

*Primary Examiner* — Ronald Eisner
(74) *Attorney, Agent, or Firm* — Patent Law Works LLP

(57) ABSTRACT

A computer-implemented technique is presented. The technique includes determining, at a server including one or more processors, one or more phones associated with a virtual phone number associated with a user. The technique includes determining, at the server, a location for each of the one or more phones. The technique includes receiving, at the server, position information from a mobile phone associated with the user indicating the user crossed a geo-fence corresponding to a specific location of a specific one of the one or more phones. The technique includes determining, at the server, a status of the specific phone associated with the geo-fence based on a previous status of the specific phone and the position information. The technique further includes selectively forwarding, from the server, an incoming phone call to the virtual phone number to the one or more phones based on their respective statuses.

30 Claims, 5 Drawing Sheets

TECHNIQUES FOR AUTOMATICALLY ACTIVATING OR DEACTIVATING A PHONE ASSOCIATED WITH A VIRTUAL PHONE NUMBER

CROSS-REFERENCE TO RELATED APPLICATIONS

This application is a continuation of U.S. patent application Ser. No. 13/314,602 filed on Dec. 8, 2011. The entire disclosure of the above application is incorporated herein by reference.

FIELD

The present disclosure relates to virtual phone numbers and, more particularly, to techniques for automatically activating or deactivating a phone associated with a virtual phone number.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A virtual telephone number is a telephone number associated with a user and one or more phones that each can have a different actual phone number. Incoming calls to the virtual phone number are automatically forwarded to the at least one of one or more phones. For example, the virtual telephone number may be associated with a server that performs call forwarding, e.g., a voice over Internet Protocol, or VoIP server. In this manner, a user can have a phone number (the virtual phone number) at which the user can always be reached irrespective of his/her location and proximity to the one or more phones.

SUMMARY

A computer-implemented technique is presented. The technique includes determining, at a server including one or more processors, one or more phones associated with a virtual phone number, the virtual phone number being associated with a user. The technique also includes determining, at the server, a location for each of the one or more phones. The technique also includes receiving, at the server, position information from a mobile phone associated with the user, the position information indicating the user crossed a geo-fence corresponding to a specific location of a specific one of the one or more phones. The technique also includes determining, at the server, a status of the specific phone associated with the geo-fence based on a previous status of the specific phone and the position information, wherein the status of the specific phone is determined to be active if the previous status was inactive and wherein the status of the specific phone is determined to be inactive if the previous status was active. The technique further includes selectively forwarding, from the server, an incoming phone call to the virtual phone number to the one or more phones based on their respective statuses.

A computing system is also presented. The system includes a phone determination module, a location determination module, a crossing determination module, a status determination module, and a call forwarding module. The phone determination module determines, at a server including one or more processors, one or more phones associated with a virtual phone number, the virtual phone number being associated with a user. The location determination module determines, at the server, a location for each of the one or more phones. The crossing determination module receives, at the server, position information from a mobile phone associated with the user, the position information indicating the user crossed a geo-fence corresponding to a specific location of a specific one of the one or more phones. The status determination module determines, at the server, a status of the specific phone associated with the geo-fence based on a previous status of the specific phone, wherein the status of the specific phone is determined to be active if the previous status was inactive and wherein the status of the specific phone is determined to be inactive if the previous status was active. The call forwarding module selectively forwards, from the server, an incoming phone call to the virtual phone number to the one or more phones based on their respective statuses.

A system comprising one or more processors is also presented. The one or more processors are configured to execute a method including determining one or more phones associated with a virtual phone number, the virtual phone number being associated with a user. The method also includes determining a location for each of the one or more phones. The method also includes receiving position information from a mobile phone associated with the user, the position information indicating the user crossed a geo-fence corresponding to a specific location of a specific one of the one or more phones. The method also includes determining a status of the specific phone associated with the geo-fence based on a previous status of the specific phone and the position information, wherein the status of the specific phone is determined to be active if the previous status was inactive and wherein the status of the specific phone is determined to be inactive if the previous status was active. The method also includes selectively forwarding an incoming phone call to the virtual phone number to the one or more phones based on their respective statuses.

A non-transitory tangible computer-readable medium having instructions stored thereon is also presented. When executed by one or more processors, the non-transitory tangible computer-readable medium causes the one or more processors to perform operations including determining one or more phones associated with a virtual phone number, the virtual phone number being associated with a user. The operations also include determining a location for each of the one or more phones. The operations also include receiving position information from a mobile phone associated with the user, the position information indicating the user crossed a geo-fence corresponding to a specific location of a specific one of the one or more phones. The operations also include determining a status of the specific phone associated with the geo-fence based on a previous status of the specific phone and the position information, wherein the status of the specific phone is determined to be active if the previous status was inactive and wherein the status of the specific phone is determined to be inactive if the previous status was active. The operations also include selectively forwarding an incoming phone call to the virtual phone number to the one or more phones based on their respective statuses.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

A user can have a virtual phone number that forwards calls to one or more phones associated with the user. The user can provide input to a server as to which of one or more phones should be active or inactive at a given time. For example, the user can provide a schedule indicating specific days/time periods, e.g., Monday-Friday, 9 am-5 pm, phone 1 (work) is active, and at all other times, phone 2 (home/cell) is active. The user's schedule, however, can change, but the user may not have time to change the schedule provided to the server.

For example, the user may work until 7 pm on a weekday. Alternatively, for example, the user may go to his/her workplace for a few hours on the weekend. Alternatively, the user may leave his/her scheduled location due to an unforeseen emergency. When the user's schedule changes, the user may not be present at a location of one of the one or more phones that receive a forwarded incoming call to the virtual phone number, which may result in another person, e.g., a spouse or a roommate, mistakenly answering the call intended for the user.

Accordingly, techniques are presented for automatically activating or deactivating a phone associated with a virtual phone number. The virtual phone number and the phone are both associated with a user. Specifically, the techniques can automatically activate or deactivate the phone associated with the virtual phone number based on the user's location. The techniques can also be aggregated with existing phone activation/deactivation schedules (described above) to improve overall performance and/or accuracy. The techniques include determining, at a server including one or more processors, one or more phones associated with the virtual phone number, the virtual phone number being associated with the user. The techniques can further determine, at the server, a location for each of the one or more phones.

The techniques can then receive, at the server, position information from a mobile phone associated with the user, e.g., in possession of the user. The position information can indicate that the user crossed a geo-fence corresponding to a specific location of a specific one of the one or more phones. The techniques can then determine, at the server, a status of the specific phone associated with the geo-fence based on a previous status of the specific phone. For example, the status of the specific phone can be determined to be active if the previous status was inactive and the status of the specific phone can be determined to be inactive if the previous status was active. The techniques can then selectively forward, from the server, an incoming phone call to the virtual phone number to the one or more phones based on their respective statuses.

Figure 1:
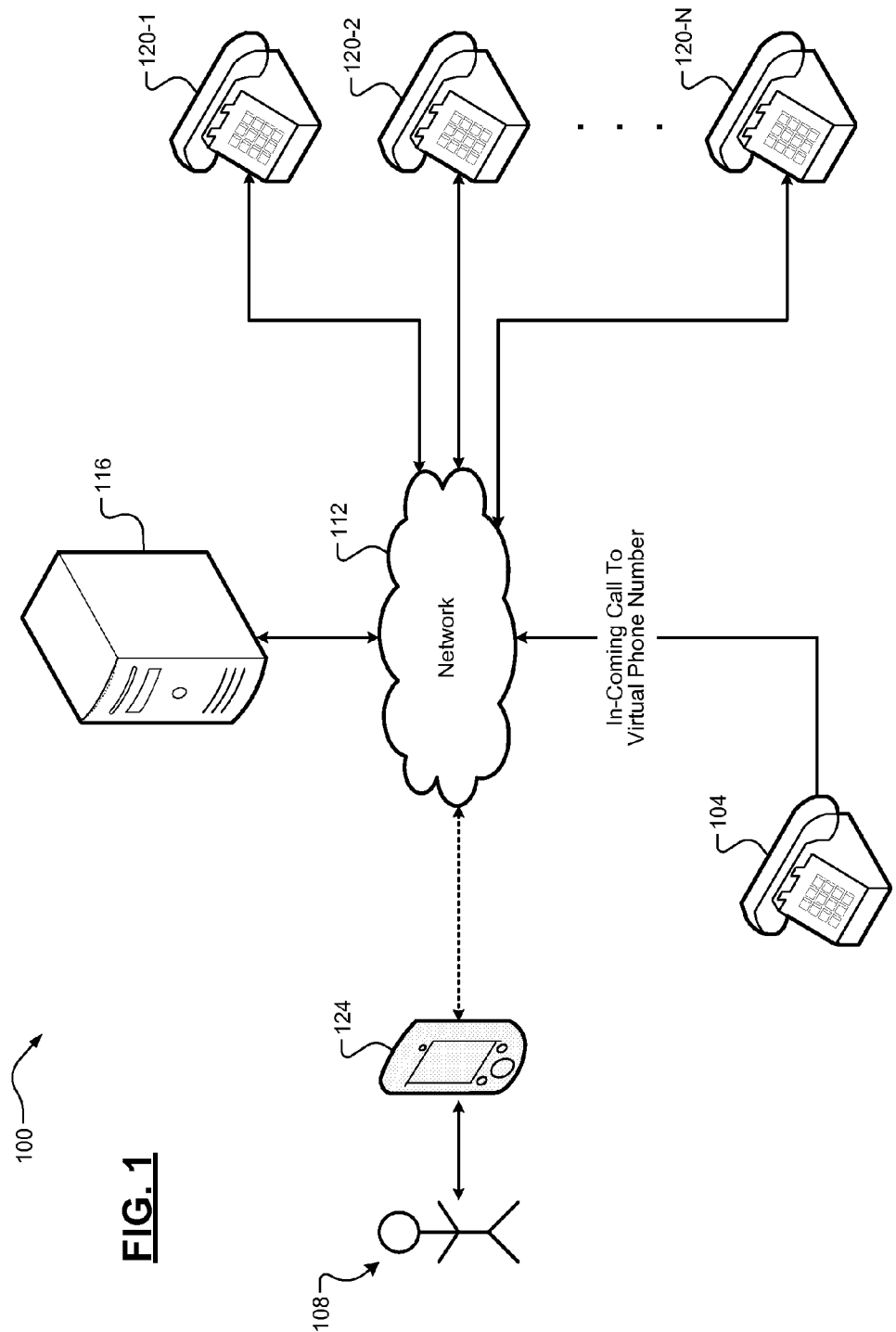
FIG. 1 is a schematic illustration of an example call forwarding system for a virtual phone number according to some implementations of the present disclosure.

Referring now to FIG. 1, a schematic illustration of an example call forwarding system 100 according to some implementations of the present disclosure is illustrated. The system 100 selectively forwards incoming calls to a virtual phone number, e.g., from a phone 104. The virtual phone number is associated with a user 108. The incoming call to the virtual phone number is routed through a network 112 to a server 116. It should be appreciated that the network 112 can be any network capable of networking telephone calls, including a public switched telephone network (PSTN), a computing network, e.g., the Internet, or a combination thereof. It should also be appreciated that while one server 116 is shown, the call forwarding system 100 can include more than one server 116. For example, the call forwarding system 100 can include a plurality of servers working together to execute the call forwarding techniques of the present disclosure.

The server 116 can receive the incoming call to the virtual phone number and selectively forward the incoming call to one or more phones 120-1, 120-2 . . . 120-N (collectively one or more phones 120) associated with the user 108. For example only, the one or more phones 120 may include a home phone, a work phone, and a vacation home phone. Additionally, the user 108 can have a mobile phone 124. While the mobile phone 124 is not illustrated as part of the one or more phones 120, it should be appreciated that the server 116 can also forward the incoming call to the virtual phone number to the mobile phone 124. In other words, the one or more phones 120 can also include the mobile phone 124. In some implementations, however, the mobile phone 124 may always receive forwarding of incoming calls to the virtual phone number, depending on the location of the user 108 and because the mobile phone 124 does not have a static location for creating a corresponding geo-fence (described in more detail below).

Figure 2:
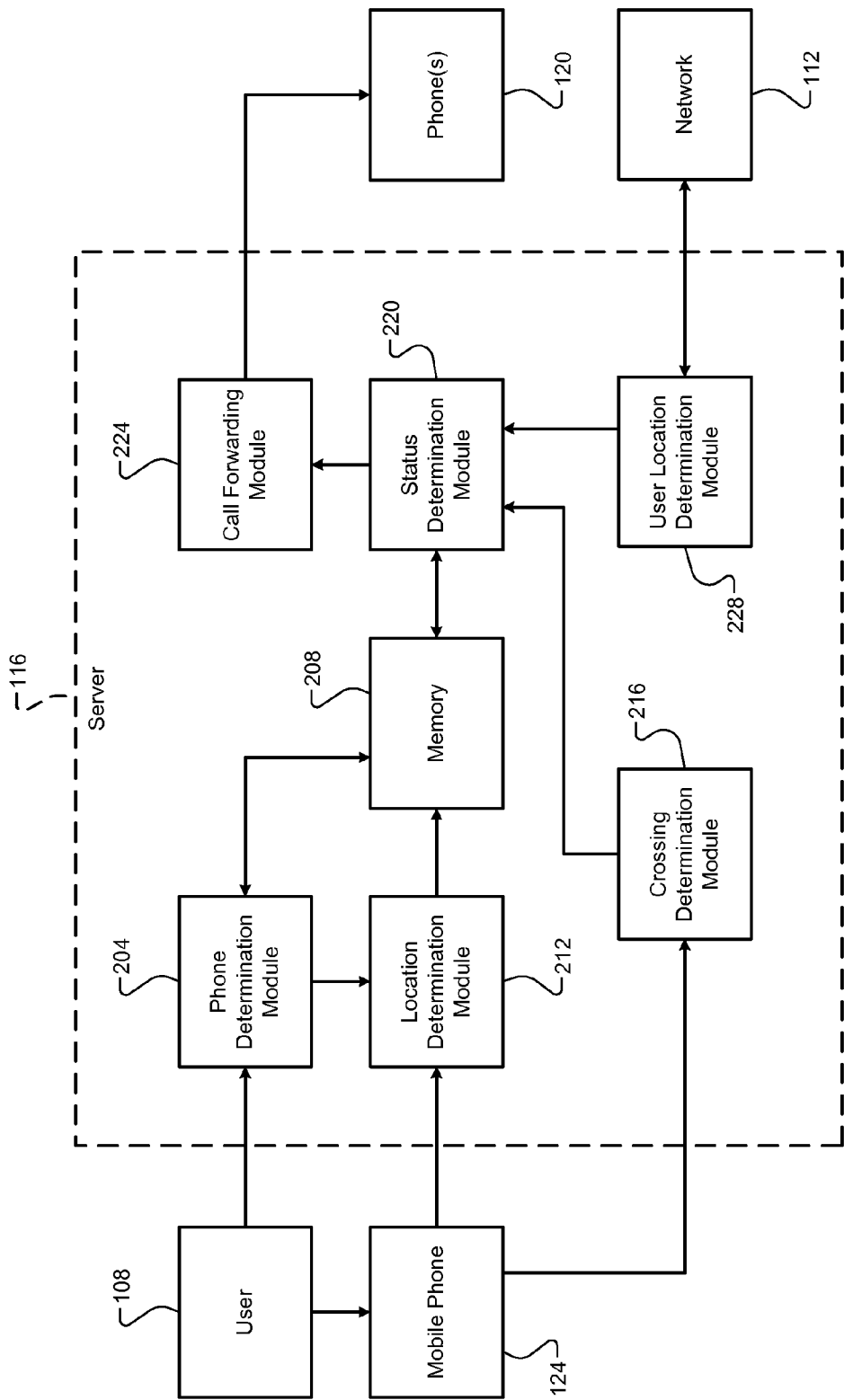
FIG. 2 is a functional block diagram of an example server of the call forwarding system of FIG. 1.

Referring now to FIG. 2, a functional block diagram of the example server 116 is illustrated. The server 116 can include a phone determination module 204, a memory 208, a location determination module 212, a crossing determination module 216, a status determination module 220, and a call forwarding module 224. In some implementations, the server 116 can further include a user location determination module 228. It should be appreciated that the server 116 can also include additional or different computing components. For example, the server 116 may include one or more processors that collectively execute the call forwarding techniques of the present disclosure.

The phone determination module 204 determines the one or more phones 120 associated with the virtual phone number. The phone determination module 204 can determine the one or more phones 120 associated with the virtual phone number based on input from the user 108, e.g., via the network 112. For example, the user 108 may specify which of his/her phones that he/she would like to be associated with the virtual phone number. The phone determination module 204 can then store data relating to the one or more phones 120, e.g., a phone identifier, in the memory 208. The memory 208 can include any form of electronic storage media, including non-volatile memory. The memory 208 can also store other data, such as data relating to one or more other virtual phone numbers and/or locations of specific phones associated with virtual phone numbers. For example, when the user 108 is near a particular phone, the user 108 can input the location of the particular phone using location determination techniques via his/her mobile phone (described in detail below).

The location determination module 212 can determine a location for each of the one or more phones 120, e.g., based on input from the user 108. For example, the input from the user 108 can include coordinate-based information from a global positioning satellite (GPS) system of the mobile phone 124. In this manner, the user 108 can provide input to the mobile phone 124 when the user 108 is nearby the specific one of the one or more phones 120. A geo-fence associated with the particular location can also be created, e.g., automatically after determination and storing of the phone location (described in detail below). For example, a geo-fence may be created having a particular shape and/or size.

Additionally or alternatively, the input from the user 108 can include a physical address, e.g., a street address. It should be appreciated that the input from the user 108 can also include other information such as a picture or image of the location, a scan of a barcode relating to the location, and/or location-related information received via near field communication (NFC) from another computing device. As previously mentioned, the location determination module 212 can then store the locations for each of the one of more phones 120 in the memory 208

The crossing determination module 216 determines whether the user 108 crosses a geo-fence corresponding to a specific location associated with a specific one of the one or more phones 120. Each of the locations may have a corresponding geo-fence. A geo-fence refers to a virtual barrier created around a physical location. The geo-fence may be generated based on input from the user 108 (described in more detail below). To protect a privacy of the user 108, the geo-fences can be stored locally at the mobile phone 124. In this manner, the server 116 is unaware of the precise location of the user 108 (the user location), and merely knows when the user 108 is within or outside of particular geo-fences. When the user 108 is in possession of the mobile phone 124 and the user 108 crosses a geo-fence, the mobile phone 124 can send position information to the server 116 (specifically, the crossing determination module 216). The crossing determination module 216 can then determine that the user 108 crossed a geo-fence based on this position information.

The status determination module 220 determines a status, e.g., active or inactive, for the specific one of the one or more phones 120 based on the position information received from the mobile phone 124 and a previous status of the specific phone. Geo-fences are made such that when the user 108 is within a geo-fence associated with a phone, the phone receives forwarded calls. This way, the phone can only receive forwarded calls when the user 108 is proximate to the phone—which ma is determined by being within the geo-fence. When the position information is received from the mobile phone 124 indicating that the user 108 crossed a geo-fence, the status determination module 220 determines the status for the specific phone corresponding to that geo-fence. The previous status of each of the one or more phones can be stored in the memory 208. In other words, each time the status of a specific phone is determined, the status may be stored (or updated) in the memory 208.

Specifically, the status determination module 220 can switch the status of the specific phone whenever the corresponding geo-fence is crossed. For example, when the previous status of the specific phone was active, the status determination module 220 can determine the status of the specific phone to be inactive. Additionally, for example, when the previous status of the specific phone was inactive, the status determination module can determine the status of the specific phone to be active. Typically, only one phone status may be determined or switched at a given time. In some cases, however, geo-fences may overlap, and in such cases the statuses of two or more phones may transition.

The call forwarding module 224 can selectively forward incoming calls to the virtual phone number to the one or more phones 120 based on their respective statuses. Specifically, the call forwarding module 224 can forward calls to each of the one or more phones 120 having an active status, while not forwarding calls to each of the one or more phones 120 having an inactive status. As previously mentioned, while the mobile phone 124 can be considered one of the one or more phones 120 for call forwarding purposes, the mobile phone 124 may always have an active status. In other words, the mobile phone 124 may be assumed to be in possession of the user 108 at most times and therefore is an appropriate phone to receive forwarded incoming calls to the virtual phone number.

For example only, when all the one or more phones 120 have inactive statuses, the call forwarding module 224 can forward an incoming call to the virtual phone number to the mobile phone 124. As previously mentioned, in some implementations the server 116 can further include a user location determination module 228. The user location determination module 228 can be used to activate or deactivate one or more of the phones 120 associated with the virtual phone number based on information other than the location of the mobile phone 124. The user location determination module 228 can retrieve user location-related information from the network 112, e.g., the Internet.

For example, the user location determination module 228 can retrieve flight information associated with the user 108, e.g., times and destinations for flights that the user 108 has taken or is scheduled to take. Additionally or alternatively, for example, the user location determination module 228 can retrieve credit card activity associated with the user 108, e.g., where/when the user 108 has made purchases. In yet another example, the user location determination module 228 can retrieve electronic mail (e-mail) account activity associated with the user 108, e.g., times and internet protocol (IP) addresses from which the user 108 accessed a particular e-mail account. Other user location-related information can also be retrieved.

The user location determination module 228 can determine the user location based on the retrieved information. The user location determination module 228 can then send the user location to the status determination module 220. The status determination module 220 can activate or deactivate one or more of the phones 120 based on a proximity of the user location to the locations of the one or more phones 120. For example, any of the one or more phones 120 within a predetermined distance from the user location can be activated and a remainder of the one or more phones 120 can be deactivated. The predetermined distance may correspond to a reasonable distance where the user 108 can hear a phone ring and/or answer the phone before the incoming call ends. For example only, the predetermined distance, e.g., the geo-fence, may be 50 feet.

Figure 3:
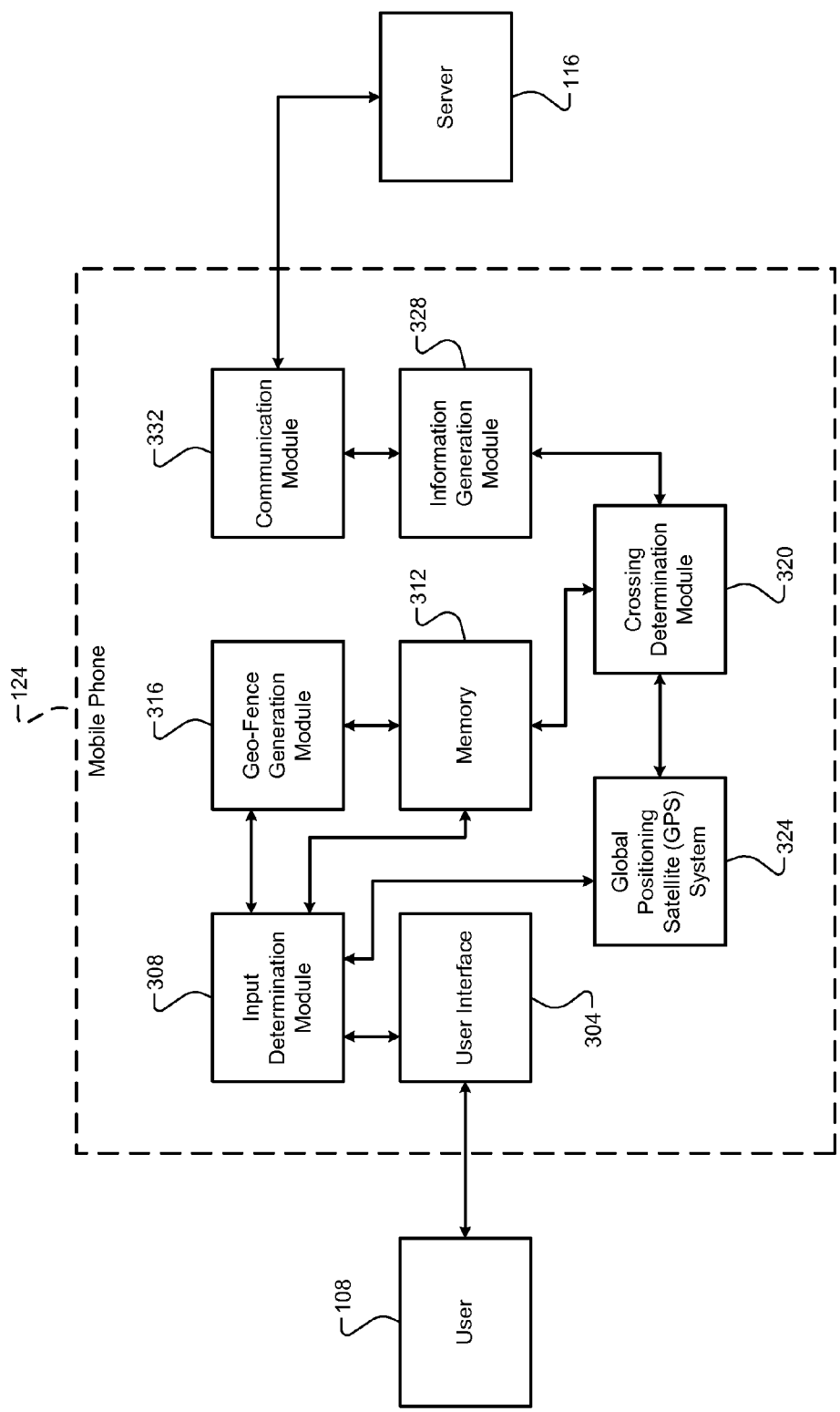
FIG. 3 is a functional block diagram of an example mobile phone of the call forwarding system of FIG. 1.

Referring now to FIG. 3, a functional block diagram of the example mobile phone 124 is illustrated. The mobile phone 124 can include a user interface 304, an input determination module 308, a memory 312, a geo-fence generation module 316, a crossing determination module 320, a GPS system 324, an information generation module 328, and a communication module 332. It should be appreciated that the mobile phone 124 can also include other computing components such as one or more processors. It should also be appreciated that the mobile phone 124, e.g., the communication module 332, can include additional or different components.

The user interface 304 can be configured to receive input from the user 108 (user input) and to display information. For example, the user interface 304 can include a keyboard and a display. For example only, the display may be a touch display, e.g., a capacitive sensing display, which both receives user input and displays information. The input determination module 308 interprets the user input via the user interface 304. Specifically, the input determination module 308 can determine a location for a specific one of the one or more phones 120 based on the user input.

As previously described, the location can be determined using the GPS system 324 of the mobile phone 124 and/or via user input indicating a physical address. The input determination module 308 can also determine one or more parameters for geo-fence configuration (one or more geo-fence parameters, described in more detail below). The one or more locations and the one or more geo-fence parameters can be stored in the memory 312. For example, the memory 312 may be any electronic storage media, including non-volatile memory.

The geo-fence generation module 316 can generate a geo-fence for each location, e.g., based on the one or more geo-fence parameters. Specifically, the one or more geo-fence parameters can include parameters relating to size and configuration of the geo-fence. For example, the one or more geo-fence parameters can include shape, e.g., circular, and size, e.g., a radius. It should be appreciated that other shapes, e.g., rectangles, and other size-related measurements, e.g., lengths of distinct portions or sides of the geo-fence, can also be implemented. The one or more geo-fence parameters can also be predetermined.

In the case where the user 108 inputs a physical address for the location, the one or more geo-fence parameters can be based on a type of building associated with the address. For example, an office building may have a larger geo-fence than a single-family home. The shape and/or size of the geo-fence may also depend on the type of building associated with the address. For example only, a rectangular geo-fence may be more appropriate for a rectangular-shaped office building. Alternatively, for example, the one or more predetermined parameters can indicate a default setting that generates the geo-fence for a specific location having a circular shape centered around the specific location and having a predetermined radius. In some implementations, data representing the geo-fence may be stored as coordinates in the memory 312.

The crossing determination module 320 can determine whether the user 108 in possession of the mobile phone 124 crosses one or more of the geo-fences. Rather, the crossing determination module 320 determines whether the mobile phone 124 crosses a geo-fence, but the mobile phone 124 is assumed to be in possession of the user 108. The crossing determination module 320 can determine whether the user 108 has crossed a geo-fence by comparing the user location (indicated by the GPS system 324) with the data representing the specific geo-fence. When the crossing determination module 320 can determine that the user 108 has crossed a geo-fence, the crossing determination module 320 can notify the information generation module 328.

The information generation module 328 can generate the position information for transmission to the server 116 to indicate to the server 116 that the user 108 crossed a geo-fence. Specifically, the information generation module 328 can generate the position information based on the notification received from the crossing determination module 320. The position information can include any suitable information to identify the geo-fence that was crossed, including but not limited to a geo-fence identifier or a location identifier. The information generation module 328 may send the information to the communication module 332, which can transmit the information to the server 116, e.g., via the network 112. For example, the communication module 332 may include the information in a packet transmitted to the server 116.

Figure 4:
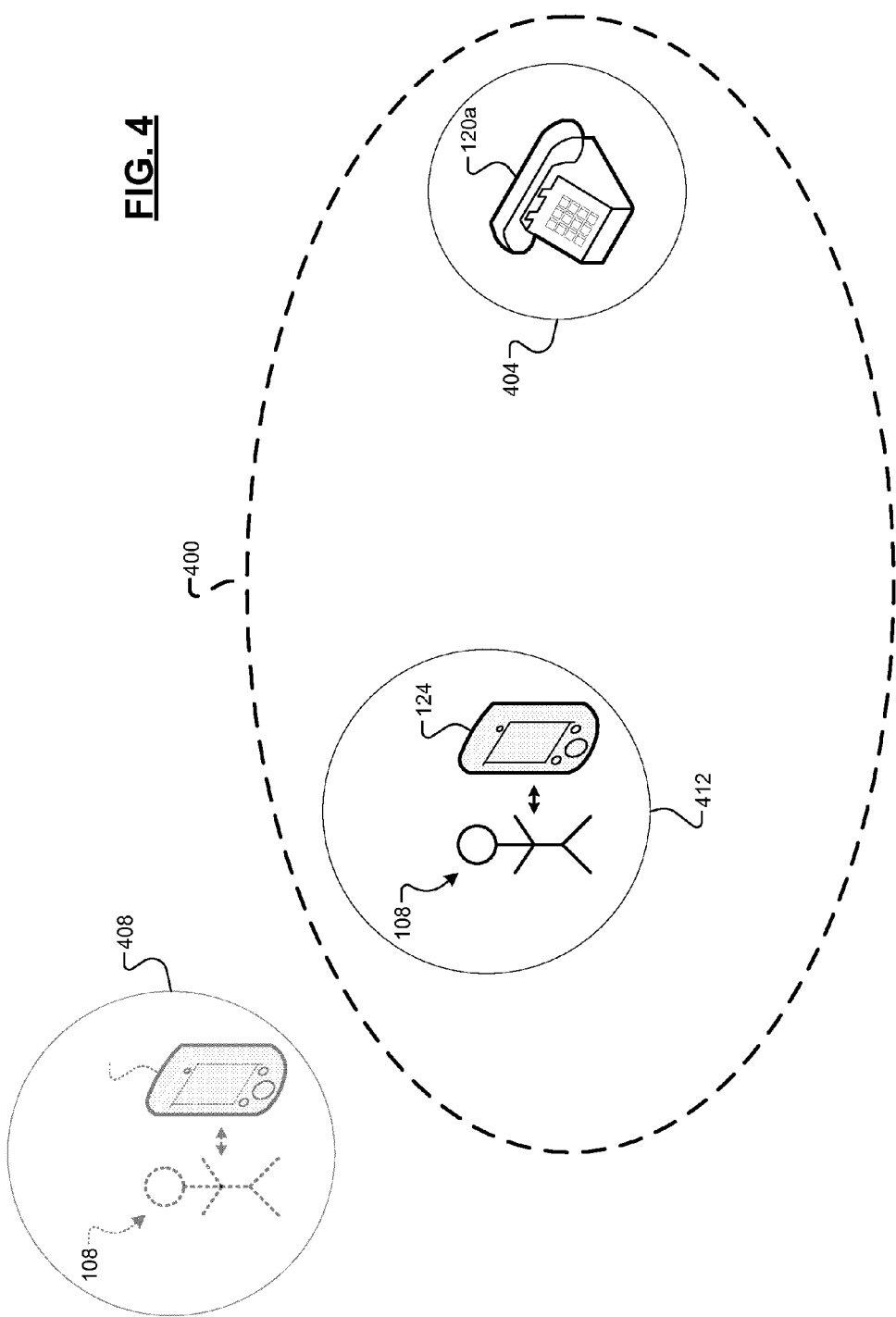
FIG. 4 is a schematic illustration of interaction between a user in possession of the mobile phone of FIG. 3 and a geo-fence associated with a phone according to some implementations of the present disclosure.

Referring now to FIG. 4, a schematic illustration of interaction between the user 108 in possession of the mobile phone 124 and a geo-fence 400 is illustrated. The geo-fence 400 corresponds to a location 404, which is associated with one of the phones 120 (identified as phone 120a). While the phone 120a (location 404) is shown to be off-center with respect to the geo-fence 400, it should be appreciated that the geo-fence 400 can have a more circular shape centered about the location 404. In the illustrated example, the user 108 moved from a first position 408 outside of the geo-fence 400 to a second position 412 inside of the geo-fence 400. When the user 108 crosses the geo-fence 400, the mobile phone 124 detects the crossing and accordingly generates and transmits the position information to the server 116. The server 116 then determines a status of the phone 120a, e.g., active, based on a previous status of the phone 120a, e.g., inactive. In this example, the server 116 can then forward incoming calls to the virtual phone number to the phone 120a, based on its active status.

Figure 5:
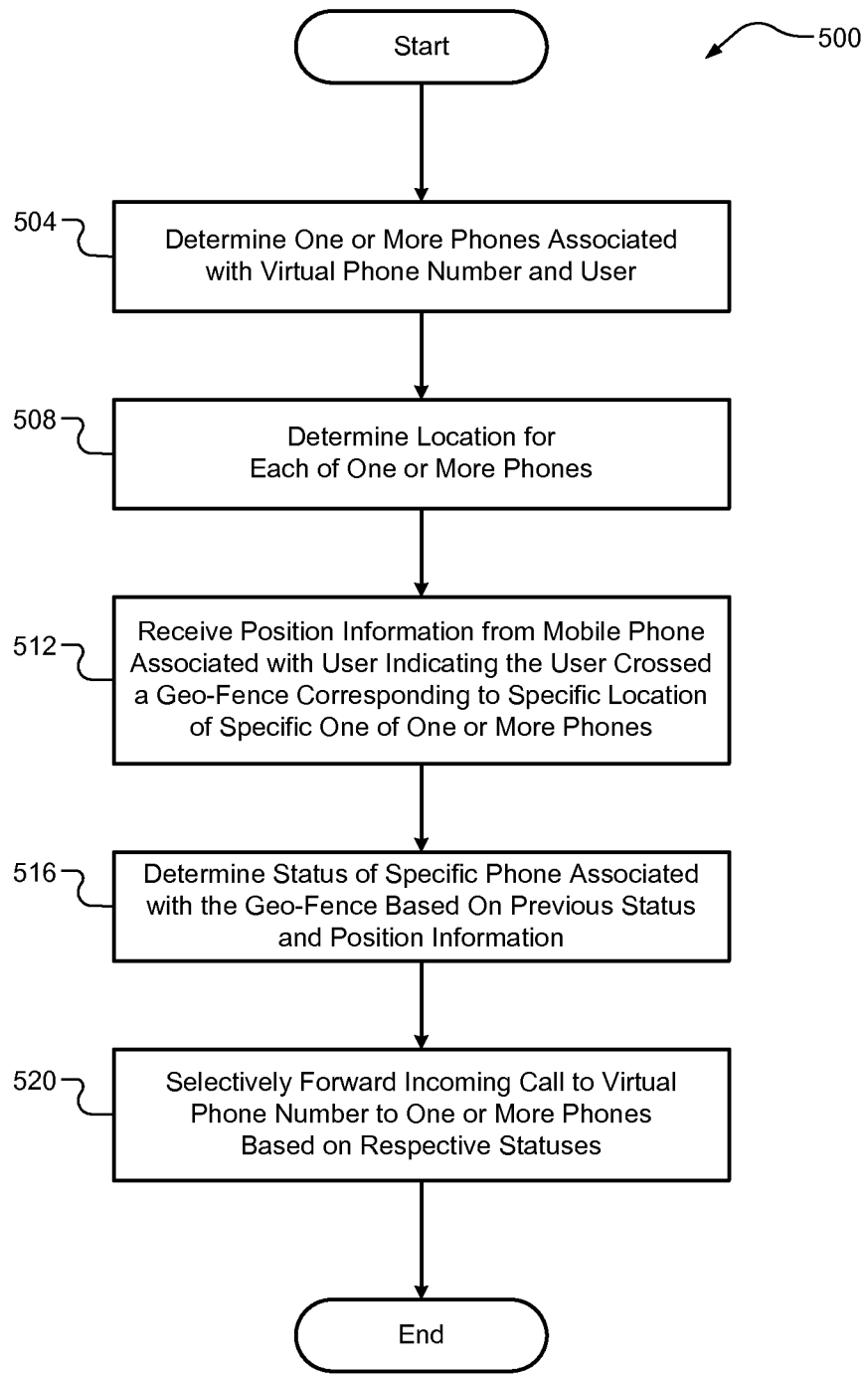
FIG. 5 is a flow diagram of an example technique for automatically activating or deactivating a phone associated with a virtual phone number according to some implementations of the present disclosure.

Referring now to FIG. 5, an example technique 500 for automatically activating or deactivating a phone number associated with a virtual phone number is illustrated. The technique 500 begins at 504.

At 504, the phone determination module 204 determines the one or more phones 120 associated with a virtual phone number, the virtual phone number being associated with the user 108. For example, the phone determination module 204 can determine the one or more phones 120 associated with the virtual phone number by searching the memory 208. Additionally or alternatively, for example, the phone determination module 204 can determine the one or more phones 120 associated with the virtual phone number based on input from the user 108.

At 508, the location determination module 212 determines a location for each of the one or more phones 120. The location determination module 212 can determine the location for each of the one or more phones 120 based on input by the user 108 via the mobile phone 124. For example, the user 108 can input the location by selecting a current location of the mobile phone 124 as indicated by its GPS system 324. Additionally or alternatively, for example, the user 108 can input the location by inputting a physical address to the mobile phone 124.

At 512, the crossing determination module 216 receives position information from a mobile phone 124 associated with the user 108, the position information indicating the user 108 crossed a geo-fence corresponding to a specific location of a specific one of the one or more phones 120. For example, the mobile phone 124 may transmit the position information when the user 108 (the mobile phone 124) crosses a particular geo-fence. The crossing determination module 216 can then determine that the user 108 (the mobile phone 124) crossed the particular geo-fence when the position information is received. For example, the position information may be an indication bit and an identifier corresponding to the particular geo-fence.

At 516, the status determination module 220 determines a status of the specific phone associated with the geo-fence based on a previous status of the specific phone and the position information, wherein the status of the specific phone is determined to be active if the previous status was inactive and wherein the status of the specific phone is determined to be inactive if the previous status was active. For example, the status determination module 220 can determine the previous status of the specific phone by searching the memory 312. Additionally, for example, the status determination module 220 can determine the status of the specific phone based on whether the position information indicates that the corresponding geo-fence was crossed.

At 520, the call forwarding module 224 selectively forwards an incoming phone call to the virtual phone number to the one or more phones 120 based on their respective statuses. For example, the call forwarding module 224 can first determine which of the one or more phones 120 has an active status. The call forwarding module 224 can then forward the incoming phone call to the virtual phone number to each of the one or more phones 120 having an active status. Additionally, for example only, the call forwarding module 224 could always forward incoming calls to the virtual phone number to the mobile phone 124 because the mobile phone 124 could be assumed to be in possession of the user 108 at all times. Control may then end or return to 504 for one or more additional cycles.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method comprising:
 receiving, using one or more computing devices, an address for a location;
 determining, using the one or more computing devices, one or more geo-fence parameters based on a type of structure situated at the address;
 determining, using one or more computing devices, a geo-fence for a phone associated with a virtual phone number, the virtual phone number being associated with a user and a size and shape of the geo-fence being based on the one or more geo-fence parameters;
 receiving, using the one or more computing devices, a fence-cross indication from a mobile device associated with the user that the user crossed the geo-fence, the geo-fence being stored at the mobile device;
 determining, using the one or more computing devices, a call forwarding status of the phone based on the fence-cross indication; and
 selectively forwarding, using the one or more computing devices, an in-coming phone call to the virtual phone number to the phone based on the call forwarding status.

2. The computer-implemented method of claim 1, wherein determining the call forwarding status of the phone based on the fence-cross indication includes changing, using the one or more computing devices, the call forwarding status of the phone in response to receiving the fence-cross indication.

3. The computer-implemented method of claim 2, wherein changing the call forwarding status in response to receiving the fence-cross indication includes determining, using the one or more computing devices, a previous call forwarding status for the phone and changing, at the computing device, the previous call forwarding status to obtain the call forwarding status.

4. The computer-implemented method of claim 3, wherein the call forwarding status is changed to active in response to receiving the fence-cross indication when the previous call forwarding status is inactive, and wherein the call forwarding status is changed to inactive in response to receiving the fence-cross indication when the previous call forwarding status is active.

5. The computer-implemented method of claim 1, further comprising receiving, using the one or more computing devices, information indicating a location of the phone from the mobile device, wherein the determining of the geo-fence for the phone is based on the information indicating the location of the phone.

6. The computer-implemented method of claim 5, wherein the information indicating the location of the phone includes at least one of (i) global positioning satellite (GPS) coordinates for the location and (ii) an address for the location.

7. The computer-implemented method of claim 5, wherein determining the geo-fence for the phone includes determining, using the one or more computing devices, a circular geo-fence centered at the location of the phone to obtain the geo-fence.

8. The computer-implemented method of claim 5, wherein determining the geo-fence for the phone includes determining, using the one or more computing devices, a geo-fence identifier to identify the geo-fence.

9. The computer-implemented method of claim 1, wherein the mobile device is a mobile phone, and wherein the phone is a landline phone or a mobile phone.

10. The computer-implemented method of claim 1, further comprising determining, using the one or more computing devices, a plurality of geo-fences for a plurality of phones, respectively, associated with the virtual phone number, and selectively forwarding, using the one or more computing devices, the in-coming phone call to the virtual phone number to the plurality of phones based on their respective statuses.

11. The computer-implemented method of claim 10, wherein the mobile device is a mobile phone, and wherein the plurality of phones includes the mobile phone.

12. The computer-implemented method of claim 11, wherein the status of the mobile phone is always active and in-coming phone calls to the virtual phone number are always forwarded to the mobile phone.

13. A computing system comprising:
 a crossing determination module configured to:
  receive an address for a location;
  determine one or more geo-fence parameters based on a type of structure situated at the address;
  determine a geo-fence for a phone associated with a virtual telephone number, the virtual phone number being associated with a user, and a size and shape of the geo-fence being based on the one or more geo-fence parameters;
  receive a fence-cross indication from a mobile device associated with the user that the user crossed the geo-fence, the geo-fence being stored at the mobile device;

a status determination module configured to determine a call forwarding status of the phone based on the fence-cross indication; and a call forwarding module configured to selectively forward an in-coming phone call to the virtual phone number to the phone based on the call forwarding status.

14. The computing system of claim 13, wherein the status determination module is further configured to determine the call forwarding status of the phone based on the fence-cross indication by changing the call forwarding status of the phone in response to receiving the fence-cross indication.

15. The computing system of claim 14, wherein the status determination module is further configured to change the call forwarding status in response to receiving the fence-cross indication by determining a previous call forwarding status for the phone and changing the previous call forwarding status to obtain the call forwarding status.

16. The computing system of claim 15, wherein the status determination module is further configured to change the call forwarding status to active in response to receiving the fence-cross indication when the previous call forwarding status is inactive, and wherein the status determination module is further configured to change the call forwarding status to inactive in response to receiving the fence-cross indication when the previous call forwarding status is active.

17. The computing system of claim 13, further comprising a location determination module configured to receive information indicating a location of the phone from the mobile device, wherein crossing determination module is further configured to determine the geo-fence for the phone based on the information indicating the location of the phone.

18. The computing system of claim 17, wherein the information indicating the location of the phone includes at least one of (i) global positioning satellite (GPS) coordinates for the location and (ii) an address for the location.

19. The computing system of claim 17, wherein the crossing determination module is further configured to determine the geo-fence for the phone by determining a circular geo-fence centered at the location of the phone to obtain the geo-fence.

20. The computing system of claim 17, wherein the crossing determination module is further configured to determine the geo-fence identifier to identify the geo-fence.

21. The computing system of claim 13, wherein the mobile device is a mobile phone, and wherein the phone is a landline phone or a mobile phone.

22. The computing system of claim 13, wherein the crossing determination module is further configured to determine a plurality of geo-fences for a plurality of phones, respectively, associated with the virtual phone number, and wherein the call forwarding module is further configured to selectively forward the in-coming phone call to the virtual phone number to the plurality of phones based on their respective statuses.

23. The computing system of claim 22, wherein the mobile device is a mobile phone, and wherein the plurality of phones includes the mobile phone.

24. The computing system of claim 23, wherein the status of the mobile phone is always active and in-coming phone calls to the virtual phone number are always forwarded to the mobile phone.

25. A computer-implemented method comprising:

receiving, using one or more computing devices, first information from a mobile phone associated with a user, the first information specifying a geo-fence for a specific phone, wherein both the mobile phone and the specific phone are associated with a virtual phone number that is associated with the user;

receiving, using the one or more computing devices, second information from the mobile phone associated with the user, the second information specifying an initial call forwarding status of the specific phone;

receiving, using the one or more computing devices, a fence-cross indication from the mobile phone that the user crossed the geo-fence associated with the specific phone, the geo-fence being stored at the mobile phone;

determining, using the one or more computing devices, a modified call forwarding status for the specific phone in response to receiving the fence-cross indication, wherein the modified call forwarding status is an opposite of the initial call forwarding status;

forwarding, using the one or more computing devices, an in-coming phone call to the virtual phone number to the mobile phone; and selectively forwarding, using the one or more computing devices, the in-coming phone call to the virtual phone number to the specific phone based on the modified call forwarding status.

26. The computer-implemented method of claim 25, wherein the first information specifies a set of coordinates representing the geo-fence.

27. The computer-implemented method of claim 25, wherein the first information specifies a location of the specific phone and further includes third information for obtaining the geo-fence including either (i) a radius for a circular geo-fence centered about the location or (ii) a type of structure located at the location and defining a shape.

28. The computer-implemented method of claim 27, wherein the specific phone is a landline phone or a mobile phone.

29. The computer-implemented method of claim 25, wherein when the initial call forwarding status is active, the modified call forwarding status is determined to be inactive, and when the initial call forwarding status is inactive, the modified call forwarding status is determined to be active.

30. The computer-implemented method of claim 29, wherein selectively forwarding the in-coming phone call to the virtual phone number to the specific phone based on the modified call forwarding status includes:

forwarding the in-coming phone call to the virtual phone number to the phone when the modified call forwarding status is active; and not forwarding the in-coming phone call to the virtual phone number to the phone when the modified call forwarding status is inactive.

* * * * *